United States Patent [19]
Thijssen et al.

[11] 3,777,892
[45] Dec. 11, 1973

[54] APPARATUS FOR THE SEPARATION AND TREATMENT OF SOLID PARTICLES FROM A LIQUID SUSPENSION

[76] Inventor: Henricus A. C. Thijssen et al., 2 Rontgenlaan, Son, Netherlands

[22] Filed: June 25, 1971

[21] Appl. No.: 156,717

[30] Foreign Application Priority Data
Jan. 27, 1971 Great Britain .................. 3,331/71

[52] U.S. Cl. ............. 210/178, 210/179, 210/185, 210/359, 210/408
[51] Int. Cl. ......................................... B01d 29/00
[58] Field of Search .................. 210/71, 77, 79, 81, 210/178, 179, 185, 359, 407, 408, 66, 67; 110/8 E, 9 E, 18 E

[56] References Cited
UNITED STATES PATENTS
3,550,775  12/1970  Cooley ............................ 210/81
2,855,100  10/1958  Findlay ........................ 210/71 UX
3,512,940  5/1970  Shapiro ........................ 210/359 X
3,290,891  12/1966  DeLano, Jr. et al. ............ 210/71 X
3,383,228  5/1968  Riekate et al. .................. 110/8

Primary Examiner—Samih N. Zaharna
Assistant Examiner—F. F. Calvetti
Attorney—Nathaniel L. Leek

[57] ABSTRACT

An apparatus for separation and purification of solids from a suspension and for leaching solid particles including a column having a piston at one end through which a liquid suspension of solid particles is suppled and through which the suspension liquid is removed. The piston is reciprocated to form a bed of solid particles; at the other end of the column the particles are progressively removed after being treated by melting or by mechanical scrapers with wash liquid being passed through the bed for cleaning or leaching purposes.

18 Claims, 4 Drawing Figures

PATENTED DEC 11 1973 3,777,892
SHEET 1 OF 2
Fig_1
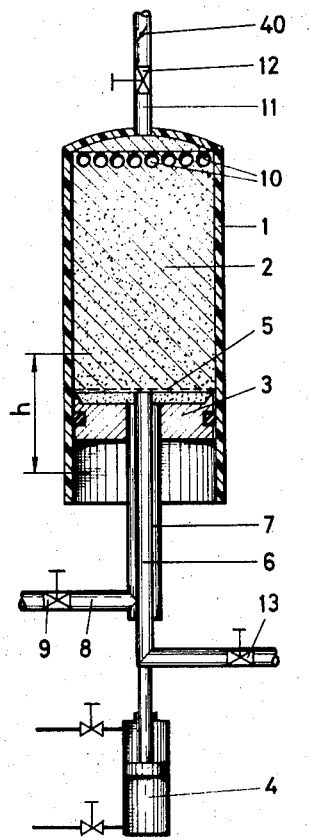
Fig_2
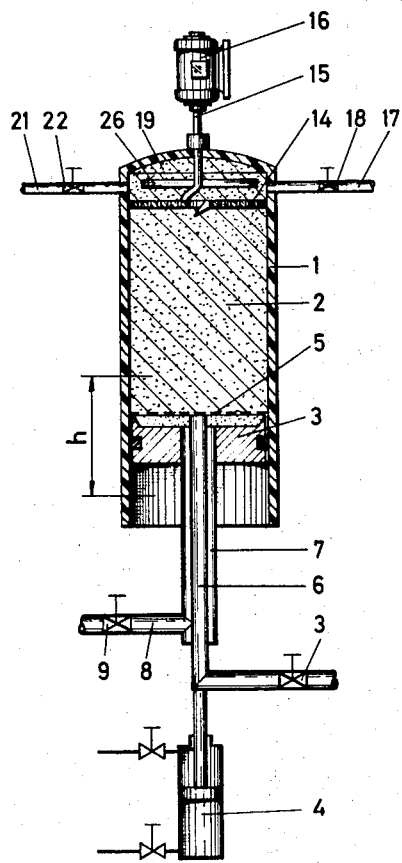
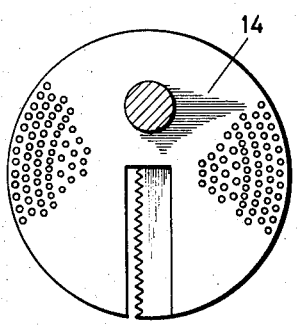
Fig_3

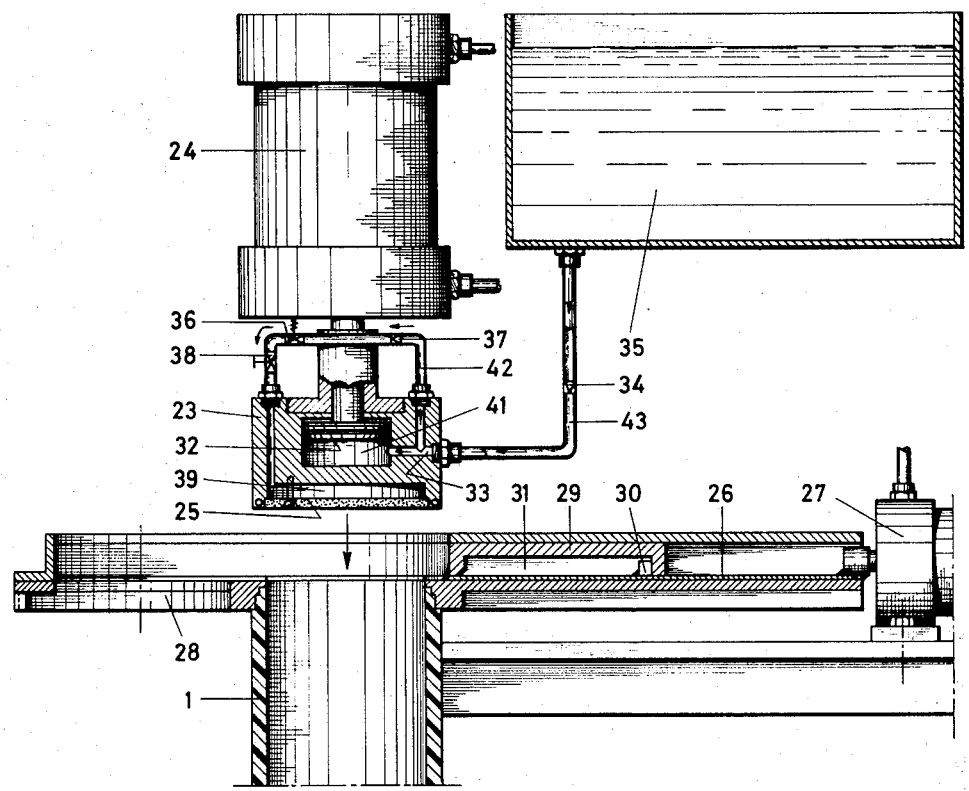

APPARATUS FOR THE SEPARATION AND TREATMENT OF SOLID PARTICLES FROM A LIQUID SUSPENSION

This invention relates to apparatus for the separation and purification of solids from a suspension, and for leaching solid particles.

A complete extraction of solids by leaching or a separation and purification of solid particles from a suspension can be obtained by washing the solid particles in counter currents with a washing fluid. The leaching or separation and purification can be effected in wash columns. In wash columns a suspension of solid particles in a liquid is fed to one end of the column, and the leached or washed solid particles are removed at the other end. The washing fluid is introduced into the column at or near to the end of the column where the solid particles are removed. Liquid is removed from the column at or near to the other end. If the solid particles can be melted it is possible to remove them from the column in the molten state. In this case the melt of the purified solids can be used as washing fluid.

A wash column for the separation and purification of crystals from their mother liquor operating with a piston is described in the U.S. Reissue Pat. No. 23,810, while in the U.S. Pat. Specification No. 2,854,494 a pulsating unit is described. In both processes crystal suspension is fed to one end of an elongated cylindrical column, the mother liquor along with a portion of the washing liquid is removed near the centre of the column through a filter in the wall of the column, and the compacted crystal mass is forced towards the other end of the column, where the crystals are completely melted, one portion of this crystal melt is removed and the other portion of the melt is returned as washing liquid in counter currents with the crystal bed, to displace the mother liquor left in between the crystals of the compacted bed.

It is a drawback of these processes, that both the mother liquor and the washing liquid are removed through the wall of the wash column. The washing liquid moves from the melting end to the wall filter along the paths of least resistance. These paths of least resistance are formed by the flow pattern diverging from the melting or washing end to the wall filter. Consequently the compact cylindrical crystal mass is flushed to a decreasing degree by washing liquid, going radially inwardly to the centre so that the washing effect will decrease. Therefore the planes in the crystal mass connecting points of equal concentration of remaining mother liquor will bulge considerably in the centre in the direction in which the crystal mass moves. For those mixtures in which the mother liquor has a higher viscosity than the washing liquid this bulge in the washing front is enhanced even further and practically only the outermost layer of the crystal mass will be washed. If the melt of the crystals is used as washing liquid, the washing of the outermost layer of the cylinder is also incomplete, since this is effected with a mixture of molten crystals and mother liquor which has been entrained towards the melter with the layers lying nearer to the centre of the crystal cylinder. This unfavourable effect of a filter fitted in the wall of the wash column on the separation of crystals and mother liquor is naturally enhanced with an increase of the diameter-length ratio of the wash column.

Neither is this problem solved by the apparatus described in the U.S. Pat. Specifications Nos. 2,885,431 and 2,886,587, in which the mother liquor can be removed from the crystal bed by means of a perforated piston which shuts off the crystal bed on the side of the washing column away from the melter. With this apparatus, the mother liquor can be removed and the washing liquid fed in a direction parallel and opposite to the direction of movement of the crystals. Nevertheless, no homogeneous flow through the crystal bed is obtained. This is because the suspension is fed near the central part of the column on one side to the crystal bed that has already been compacted during the compression stroke of the perforated piston. The feeding of the crystal suspension is provided for by a pumping device located outside the wash columns. By this feeding method the crystals are compacted irregularly over the cross section. Moreover the concentration of the dissolved substance in the liquid phase will be higher near the feeding point of the suspension than on the side remote from the feeding point. Since a difference in concentration in the liquid as a rule also implies a difference of viscosity in the liquid, a disturbance of the concentration profile produced near the feeding point of the suspension will be enhanced. If the viscosity of the washing liquid is lower than that of the mother liquor, the mother liquor will move as a bulge in the direction of the melter. If, by means of the wash columns described in the aforsaid patent specifications, crystals are purified from the mother liquor by counter-current washing with the melt of the crystals, there will also take place a considerable channeling of the washing liquid. These channels of washing liquid in the crystal bed extend from the melting front of the crystal bed to the neighbourhood of the wall filter where the mother liquor and the washing liquid are removed. Since the washing liquid meets with practically no flow resistance in said channels, only a very small portion of the washing liquid will flow through the compact crystals and the washing of the crystal bed accordingly will become even less satisfactory.

I have found that a completely flat washing front perpendicular to the direction of movement of the compacted solid particles is obtained if the washing liquid is removed through a perforated piston closing the wash column on the side in the direction opposite to the direction of movement of the bed of solids, the suspension of solid particles in a liquid is fed through this same piston, and the washing liquid is fed to the bed over a plane that is perpendicular to the direction of movement of said bed.

When using a melter as the treating means to facilitate removal of successive portions of the bed from the column I have found that it is possible to ensure that no channeling will take place by melting only a fraction of the bed of solids, and allowing the remainder of the bed to move through the openings in the melter to a second melter, where the solids are completely converted into liquid state. I found that, when using one melter, the same favourable effect can be obtained by providing the outer wall parts of the melter which do not come into contact with the melting solids with a heat insulating layer.

Accordingly, the present invention provides apparatus for separation and purification of solids from a suspension and for leaching solid particles comprising a column with piston means closing one end of the column for the compacting of the solid particles to a bed and transporting the compacted bed of solid particles during its compression stroke, treating means of the opposite end of the column for treating successive portions of the bed to facilitate their removal from the column, and discharge means at the opposite end of the column through which the treated successive portions of leached or purified solid particles or the melt of the purified solid particles is removed, and means at said opposite end by which washing fluid for the leaching or purification of said solid particles is fed to the column.

According to another feature the suspension of solid particles in a liquid is fed to the column through the piston during its suction stroke and the liquid phase is expelled from the suspension through the piston during the compression stroke.

Preferably the apparatus comprises a valve in the suction line for the suspension which is closed during the compression stroke and open during the suction stroke of the piston and a valve in the discharge line for the liquid of said suspension, which is closed during the suction stroke and open during the compression stroke of the piston.

According to yet another feature, a piston surface, facing the bed of solid particles in the column, is selectively permeable for the liquid, and is provided with one or more openings for the feeding of the suspension.

In an apparatus in which the treating means includes a heater or heaters for melting solid particles the heater or heaters are composed of tubes internally heated with a fluid, said tubes having a heat insulating layer on their outer surfaces at the side of the tubes opposite the piston.

To improve the effective heat surface of the melter, tubes having a triangular cross-section can be applied with one point of the triangle directed to the piston.

According to another feature the heater or heaters are composed of electrical heated wires.

In a preferred arrangement the heaters consist of two or more melting guides each positioned parallel to the surface of the piston.

Preferably the slits between the heated tubes or wires are at least 1.0 mm.

According to another feature a valve for adjusting the washing front in the column is provided in the discharge line of the melt of the solid particles.

In another arrangement of the apparatus the solid particles are not melted, but a treating means is provided for the mechanical removal of the solid particles from the column and for the feeding of wash fluid to said column.

The means for the mechanical removal of the solid particles may comprise according to the invention a rotated perforated disc provided with scraping means.

According to another arrangement with mechanical means for removal of the solid particles a cover is provided with means to close and open the end of the column opposite to the piston of the column and provided with a filter through which a wash fluid can be pressed into the column in the closed position of the column and a cutting device to remove the solid particles in the open position of the column.

According to another feature a slide is provided slidable relative to the cutting device and a pin fixed to the cutting device and provided with a slot in the slide the arrangement being such that only when the cutting edge has completely cut off the piece of the bed of compressed solids the slide will move along with it when the cutting device continues its movement in the same direction and that when the cutting device is retracted the slide will first be stationary to strip off a piece of the bed from the cutting device so that it will fall down through an opening provided at that place.

In a preferred arrangement a piston is provided in the cover serving as a feeding pump for the wash fluid to the column.

In that case preferably a valve is provided in the feed line of the washing fluid between the feed pump and the column to control the location of the wash front.

The melter screen is of course positioned in the wash column so as to be perpendicular to the direction of movement of the compacted bed when the apparatus is in use.

The invention will be further described with reference to the accompanying drawings in which:

FIG. 1 is a vertical section illustrating one embodiment of the invention;

FIG. 2 is a vertical section similar to FIG. 1 of an apparatus illustrating a further embodiment of the invention;

FIG. 3 is a plan view of the scraper blade shown in FIG. 2; and

FIG. 4 is a partial vertical section of an apparatus illustrating a still further embodiment of the invention.

Referring to FIG. 1, in wash column 1 the bed of compressed solids 2 is compacted and forced against the treating means melter 10 by piston 3. The piston 3 has three different functions. The piston serves as a pump for feeding suspension of solid particles in a liquid to the wash column; it serves as a filter for the removal of liquid, and in addition, during the compression stroke, it compacts the bed and forces the bed against the melter screen (10). The liquid flows off through a filter 5 provided on the piston on the side facing the crystal bed. The suspension is fed via a passage 6 in this same piston. The amount of pressure exerted by piston 3 is derived from the hydraulic or pneumatic pressure cylinder 4. The liquid which, during the delivery stroke, is forced from between the solid particles or is displaced by the washing fluid can escape via the filter 5 in piston 3. The liquid escaping through filter 5 is removed via the pipe 7 concentrically fitted about pipe 6 to pipe 8.

The melter consists of a flat screen of parallel pipes, which are internally heated on the inside by a heating medium. The gaps between the pipes permits the escape of the molten particles. These molten particles are partly removed via the discharge means which includes the pipe 11. The remaining portion of the molten particles flows back into the bed as reflux liquid and displace the mother liquor left behind between the compacted solid particles. During the whole compression stroke of piston 3, valve 9 is opened. As soon as piston 3 has reached its extreme compression position, the valve 12 of the discharge means for the removal of melt and the valve 9 for the removal of mother liquor are closed. Valve 13 in the pipe 6 for feeding suspension of solid particles in a liquid is opened and the piston is retracted through a distance $h$ by the double-acting cylinder 4. During the return stroke the compacted bed is not disturbed at all and a space is formed which is delimited by the piston 3 and the compacted bed. The now free surface of the bed is truly parallel to the delivery piston. The space between the compacted bed 2 and the screen surface 5 of the piston 3 fills homogeneously with suspension which is fed via pipe 6. When the piston has reached the extreme suction position, valve 13 is closed again, valve 9 is opened, and the piston is moved in the direction of the melter again by the double-acting cylinder 4. The free liquor present in the crystal suspension is removed during the first phase of the compression stroke through filter 5 via pipe 7 to discharge pipe 8. The first phase of the compression stroke is completed when all the free liquor has been removed from the suspension and the freshly fed solid particles have been compressed in the form of a compact disc of uniform thickness on the previously formed bed. During the second phase of the compression stroke, under the influence of the drive of the piston, a length of the bed is melted off, which is equal to the layer of solid particles deposited on the bed during the first compression phase. The melt discharge valve 12 is opened during the second phase of the compression stroke. The adjustable restriction valve 40 ensures the desired washing effect. The capacity of the wash column is mainly determined by the rate at which the bed is melted off.

This rate naturally increases with an increase of the temperature difference between the melting solids and the fluid flowing through the pipes of the melter screen. The melting rate is also determined by the effective heat transfer surface of the melter. In case circular tubes are applied only a small surface is effective. To improve this, tubes with a triangular cross-section can be applied with one point of the triangle directed towards the bed and its opposite side thermally insulated. The pressure on the bed is controlled via a pressure regulator in the compression pipe of the double-acting cylinder 4. The particles in the compacted bed move in the form of a solid but porous cylinder perpendicularly to and in the direction of the melter screen 10. Since in the embodiment according to the invention the filter for the removal of mother liquor and washing liquid is parallel to the melter screen, the washing liquid and particles move in true counter-currents, so that the formation of a parabolic washing front is avoided. The fraction of the surface of the piston, which is not occupied by the filter but is used for the feeding of the suspension, is so small that a disturbing influence of this on the flow through the bed is negligible.

The formation of channels in the bed is prevented in this embodiment according to the invention by the heat insulating layer on the outer wall parts of the screen pipes of the melter which do not contact the melting particles.

An alternative embodiment of the invention is shown diagrammatically in FIGS. 2 and 3. Just as in the embodiment of FIG. 1, the bed of solids is again moved and compressed by piston 3, the liquid is removed via screen 5 in the piston, and the suspension is fed via a passage in the piston. In this case the washing liquid used is a liquid fed from the outside, and the particles are removed as such. The bed is scraped off mechanically with the aid of treating means which include the scraper blade 14, which is mounted on the scraper shaft 15. Scraper shaft 15 is rotated by motor 16. The amount of liquid which is fed via pipe 17 into the suspension chamber 19 is so adjusted by control valve 18 that the suspension that is formed by mixing the scraped-off particles with the washing liquid can be readily pumped. A good homogeneous suspension of the particles in the liquid is obtained by means of the mixing arms 20 mounted on the scraper shaft 15. The suspension is removed via discharge means which includes discharge pipe 21. During the suction stroke of the piston, control valve 18 as well as 22 are closed. Both valves also remain closed during the first phase of the compression stroke. During the second phase of the compression stroke the desired amount of washing liquid is fed via pipe 17 and the suspension discharge valve 22 is so adjusted that at the pressure prevailing in the suspension chamber exactly the desired washing effect of the particles in the compacted bed 2 is obtained. The scraping capacity is controlled by the rate of rotation of the scrapers. The pressure exerted by the double-acting cylinder on piston 3 is so adjusted via a pressure regulator in the compression pipes of the double-acting cylinder that the liquid is removed at the desired rate from the suspension via screen 5. The pressure exerted on the bed by piston 3 should of course always be greater than the pressure exerted on the bed by the suspension in the chamber 19. The amount of washing liquid passed through the bed is determined by the fall in pressure of the washing liquid through the bed.

In FIG. 4 a third embodiment of the invention is shown in which as in the embodiment according to FIG. 2 the solid particles are removed mechanically. Just as in the embodiments of FIG. 1 and 2 the bed is moved and compressed by piston 3, the liquid is removed via screen 5 in this piston and the suspension is fed via a passage in the piston. In FIG. 4 these parts are not shown, only the upper portion of wash column 1 is shown.

The end of the wash column 1 opposite to the piston can be closed by a cover 23 by means of a hydraulic or pneumatic pressure cylinder 24. Cover 23 is provided at its innerside with a perforated disc 25. A cutting device 26 for removing the particles is operated by a cylinder 27 and can take along with it a slide 29 by means of a pin 30 fitting in a slit 31 of the slide 29 when the cutting edge of the cutting device has passed the column 1 to an opening 28.

To avoid the use of a special metering pump the cover 23 is formed as a pump, the cover itself serving as a pump cylinder in which piston 32 can move. This cylinder is connected by a duct 33 with a non-return valve 34 to a vessel 35 containing the washing liquid. The duct 33 is connected through non-return valve 37, solenoid valve 36 and control valve 38 with the space behind the perforated disc 25.

In operation first piston 3 builds up a bed with cover 23 closing column 1. After a predetermined thickness of this bed has been formed, washing liquid is pressed by piston 32 through the perforated disc 25. By this the washing front is displaced. When it has reached a desired location, supply of washing liquid is stopped and cover 23 lifted from the column 1 by the cylinder 24. Piston 3 presses the bed out of column 1. Cutting device 26 then cuts off a piece of the bed and pushes it over opening 28 by means of slide 29. Then the cutting knife 26 is retracted, but because of the pin and slit construction 30, 31, slide 29 will move the piece of the bed from the knife and let it fall into the opening 28. When the piston 32 is retracted by cylinder 24, cover 23 is raised until it comes into abutment with the cylinder 24. Then the piston 32 moves upward in cover 23 and washing liquid is drawn from vessel 35 through duct 33 and non-return valve 34. When going down the washing liquid is pressed as soon as the cover 23 closes the wash column 1. As soon as the solenoid valve 36 is opened, washing liquid will flow to the space 39. The moment the signal is given, the solenoid valve 36 closes to determine the location of the wash front.

It will be clear to one skilled in the art that other means for eliminating the solid particles from the column and for washing and leaching are within the scope of the invention. In the drawing a vertical position of the apparatus is shown but any position is possible.

The invention will be explained more fully by means of the following examples, and it must be understood that the invention is not restricted to these examples.

EXAMPLE I.

Use is made of the separation column shown diagrammatically in FIG. 1. The diameter of the separation column is 60 mm, its overall length is 600 mm. The stroke of the piston 3 is 100 mm. The melter screen is composed of steel pipes with an external diameter of 5 mm. On the side turned away from the ice bed the pipes are coated with a 3 mm layer of polyester resin. The width of the gap between the pipes is 1.0 mm. The screen 5 fitted on piston 3 contains perforations with a diameter of 0.20 mm and a free area of the perforation of 25 percent. The feeding pipe 6 for the suspension has an internal diameter of 13 mm.

A suspension of ice crystals in a 30 percent by weight saccharose solution is fed to the wash column. The suspension contains 25 percent by weight of ice crystals. The average diameter of the ice crystals is 0.4 mm. The melting heat is supplied to the melter grid by circulating water with a temperature of 60° C. This heating water flows at a high rate through the pipes of the melter grid. At this temperature of the heating liquid the capacity of the wash column is 40 kg of suspension liquid per hour. During the suction stroke of piston 3, valves 9 and 12 are closed. During this suction stroke the space between the plunger and the ice bed compacted during the preceding compression stroke fills homogeneously with the ice suspension fed via pipe 6 through the opened valve 13. As soon as the piston has reached the extreme position a limit switch is operated and by this limit switch valve 13 is closed, valve 9 is opened, and subsequently the double-acting cylinder 4 is returned to the compression position. The pressure exerted on the piston by the double-acting cylinder is 5 kg/cm$^2$ during the compression stroke. During the following first phase of the compression stroke all the free liquid is removed through filter 5 via pipes 7 and 8. Valve 12 still remains closed. The second compression phase starts as soon as the freshly fed ice has compacted in the form of a disc on the previously formed ice bed. Shortly after the second compression phase has started, valve 12 is opened, so that the water formed by melting can escape. The duration of the period during which valve 12 is opened is so adjusted that the washing front is formed approximately in the middle of the column. Under the said conditions less than 3 percent of the amount of molten ice crystals is mixed with the liquor. The sugar concentration of the liquor is decreased less than 0.3 percent. The sugar concentration in the flow of molten crystals leaving the column is less than 0.01 percent by weight.

EXAMPLE II.

Use is made of the separation column shown diagrammatically in FIG. 1. The diameter of the separation column is 60 mm, its overall length is 600 mm. The stroke of the piston 3 is 100 mm. The melter grid is composed of metal pipes with a triangular cross-section, the width of the outside base of the triangle is 5 mm and the length of the two equal legs of the triangle is 12 mm each. The wall thickness is 1.0 mm. The pipes are made of copper and are nickel-plated. The small side of the triangle turned away from the ice bed is coated with a 3 mm layer of polyester resin. The width of the gap between the parallel pipes is 1.5 mm. The screen 5 fitted on piston 3 contains perforations with a diameter of 0.20 mm and a free area of the perforation of 25 percent. The feeding pipe 6 for the suspension has an internal diameter of 13 mm.

A suspension of ice crystals in a 30 percent by weight saccharose solution is fed to the wash column. The suspension contains 25 percent by weight of ice crystals. The average diameter of the ice crystals is 0.4 mm. The melting heat is supplied to the melter screen by circulating water with a temperature of 60° C. This heating water flows at a high rate through the pipes of the melter grid At this temperature of the heating liquid the capacity of the wash column is 80 kg of suspension liquid per hour. During the suction stroke of piston 3, valves 9 and 12 are closed. During this suction stroke the space between the plunger and the ice bed compacted during the preceding compression stroke fills homogeneously with the ice suspension fed via pipe 6 through the opened valve 13. As soon as the piston has reached the extreme position a limit switch is operated and by this limit switch valve 13 is closed, valve 9 is opened, and subsequently the double-acting cylinder 4 is returned to the compression position. The pressure exerted on the piston by the double-acting cylinder is 6 kg/cm$^2$ during the compression stroke. During the following first phase of the compression stroke all the free liquid is removed through filter 5 via pipes 7 and 8. Valve 12 still remains closed. The second compression phase starts as soon as the freshly fed ice has compacted in the form of a disc on the previously formed ice bed. As soon as the second compression phase has started, valve 12 is opened, so that the water formed by melting can escape.

Restriction valve 40 is so adjusted that the washing front stays approximately in the middle of the wash column. Under the said conditions less than 3 percent of the amount of molten ice crystals is mixed with the liquor. The sugar concentration of the liquor is decreased less than 0.3 percent. The sugar concentration in the flow of molten crystals leaving the column is less than 0.01 percent by weight.

Comparing this example with example I it appears that under the same conditions and with the same result as to the purity of the molten crystals leaving the column the capacity of the wash column is 80 kg of suspension liquid per hour with pipes having a triangular cross section and 40 kg of suspension liquid per hour with pipes having a circular cross section.

EXAMPLE III.

In this example the wash column shown diagrammatically in FIGS. 2 and 3 is used. The column has an internal diameter of 60 mm and a length of 700 mm. The stroke of the piston is 100 mm. Mounted on the scraper shaft is a scraper member as shown in FIG. 3. The scraper member is a round disc formed of perforated plate. The diameter of the screen perforations is 0.3 mm and the free area of the perforation is 30 percent. The thickness of the perforated plate is 1 mm. Fitted in the disc is a scraping blade. The scraping blade has length equal to the radius of the disc and is placed perpendicularly to the circumference. The cutting edge of the blade is serrated. The speed of the scraper is 90 rotations/minute and this speed is variable. The height of the suspension chamber above the scraper blade is 50 mm. A suspension of sacchorose crystals in its saturated aqueous solution and dyed with raspberry red is fed to the column. The crystal concentration in the suspension is 30 percent by weight and the temperature is +20° C. The average crystal diameter is 0.5 mm.

As soon as piston 3 has reached the extreme position, the valves 18, 21 and 9 are closed and the valve 13 in the suspension feeding pipe is opened by limit switches on the double-acting cylinder. The piston 3 is now retracted over a distance of 10 cm by the cylinder 4. Via pipe 6 the space formed between piston 3 and the compacted crystal bed fills homogeneously with fresh crystal suspension. As soon as the extreme suction position has been reached, the suspension feeding valve 13 is closed and valve 9 is opened by limit switches on double-acting cylinder 4. The piston now moves in the direction of the suspension chamber 19 again. The pressure adjusted on the piston 3 is 5 kg/cm². The saturated saccharose solution with its colouring matter is removed through screen 5 via pipes 7 and 8. As soon as the fresh charge of crystals has been compacted, valve 18 is opened and an amount of 90 liter/hour of pure and colourless saturated saccharose solution of 20° C is fed via pipe 17 to the suspension chamber 19. Simultaneously with the opening of valve 18, valve 22 is also opened. The degree of opening of valve 22 is so adjusted that the desired washing effect is attained and the transition from red to colourless is approximately in the middle of the column. The completely colourless crystal suspension is removed via pipe 21. The amount of washing liquid required for a complete purification of 30 kg of crystals is less than 5 kg of saturated saccharose solution per hour. By means of an Eel Colorimeter it is not possible to detect any colouring matter in the purified suspension that has been removed.

EXAMPLE IV.

In this example use is made of a mechanical device for removal of solids from the column as shown schematically in FIG. 4. The other parts of the wash column are identical to those illustrated in FIG. 2. The diameter of the separation column is again 60 mm, its overall length 600 mm. The suction stroke of piston 3 is 300 mm. The perforated disc 25 in FIG. 4 has a diameter of 60 mm and a thickness of 1.0 mm. Cutting knife 26 has a width of 62 mm and has a stroke length of 140 mm. The cutting knife is operated by the double-acting cylinder 27.

A suspension of ice crystals in a 30 percent by weight saccharose solution is fed to the wash column. The suspension contains 25 percent by weight of ice crystals. The average diameter of the ice crystals is 0.4 mm. The washing liquid is supplied to chamber 39 by piston 32. The capacity of the wash column is 80 kg of suspension liquid per hour.

During the suction stroke of piston 3, valves 9, 12 and 36 are closed, and cover 23 is closing the upper end of the wash column. This cover is operated by the double-acting cylinder 24. In the closed position of the upper end of the wash column the piston 32 in the cover 23 operated by cylinder 24 compresses the washing liquid in chamber 41 to a pressure of 20 kg/cm².

During this suction stroke the space between piston 3 and the ice bed fills homogeneously with the ice suspension fed via pipe 6 through the open valve 13. As soon as piston 3 has reached the extreme position a limit switch is operated and by this limit switch valve 13 is closed, valve 9 is opened and the double-acting cylinder 4 is returned to the compression position. The pressure exerted on the piston 3 by the double-acting cylinder 4 is 6 kg/cm² during the compression stroke, while the pressure exerted on cover 23 and its perforated disc 25 by the double-acting cylinder 24 is 7 kg/cm².

During the following first phase of the compression stroke all the free mother liquor is removed through filter 5 via pipes 7 and 8. The second compression phase starts as soon as the freshly fed ice has compacted in the form of a disc on the previously formed ice bed. Solenoid valve 36 is now opened and the washing liquid from chamber 41, can flow via duct 42 and chamber 39 through the perforated disc 25 into the compacted ice bed. Restriction valve 38 in duct 42 is so adjusted that the washing liquid in a chamber 39 exerts a pressure of 4 kg/cm² on the compacted ice bed. As soon as the washing front passes a predetermined position in the wash column, solenoid valve 36 is closed. Thereupon cover 23 is lifted from column 1 by the cylinder 24 and piston 3 presses an amount of compacted ice out of the wash column 1 equal to the amount of ice fed to the wash column during the suction stroke of piston 3. Said amount of ice is cut off from the compacted ice bed by cutting knife 26 and removed by slide 29. When cover 23 is lifted from the wash column, said cover will come into abutment with cylinder 24 and fresh washing liquid is drawn from vessel 35, and flows through duct 43 and non-return valve 34 into chamber 41. When cover 23 is pushed downwards by means of the double-acting cylinder 24 the washing liquid is compressed, and non-return valve 34 is closed, as soon as cover 23 contacts the upper end of the wash column 1. Under said conditions the sugar-concentration in the piece of the ice bed leaving the wash column is less than 0.01 percent by weight.

EXAMPLE V.

Also in this example use is made of the wash column with the mechanical device for removal of solids from the column as shown in FIG. 4. The other parts of the wash column are identical to those illustrated in FIG. 2. The diameter of the column is 60 mm, its overall length 600 mm. The suction stroke of piston 3 is 300 mm. The perforated disc 25 in FIG. 4 has a diameter of 60 mm and a thickness of 1.0 mm. Cutting knife 26 has a width of 62 mm and has a stroke length of 140 mm. The cutting knife is operated by the double-acting cylinder 27.

A suspension of finely ground roasted coffee beans in an aqueous solution of coffee extract is fed to the wash column. The suspension is obtained by mixing 300 grams of ground coffee per 1,000 grams of a 15wt percent solution of coffee extract in water. The maximum diameter of the coffee particles is 1.0 mm. The coffee fines are removed by screening. The washing water is supplied to chamber 39 by piston 32. The temperature of the washing water is 100° C. The capacity of the wash column is 5 kg of coffee beans per hour.

During the suction stroke of piston 3, valves 9, 12 and 36 are closed, and cover 23 is closing the upper end of the wash column. This cover is operated by the double-acting cylinder 24. In the closed position of the upper end of the wash column the piston 32 in the cover 23 operated by cylinder 24 compresses the washing liquid in chamber 41 to a pressure of 20 kg/cm$^2$.

During the suction stroke the space between piston 3 and the coffee bed fills homogeneously with the coffee suspension fed via pipe 6 through the open valve 13. As soon as piston 3 has reached the extreme position a limit switch is operated and by this limit switch valve 13 is closed, valve 9 is opened and the double-acting cylinder 4 is returned to the compression position. The pressure exerted on the piston 3 by the double-acting cylinder 4 is 6 kg/cm$^2$ during the compression stroke, while the pressure exerted on cover 23 and its perforated disc 25 by the double-acting cylinder 24 is 7 kg/cm$^2$.

During the following first phase of the compression stroke all the free liquid is removed through filter 5 via pipes 7 and 8. The second compression phase starts as soon as the freshly fed coffee has compacted in the form of a disc on the previously formed coffee bed. Solenoid valve 36 is now opened and the washing liquid from chamber 41, can flow via duct 42 and chamber 39 through the perforated disc 25 into the compacted coffee bed. Restriction valve 38 in duct 42 is so adjusted that the washing liquid in a chamber 39 exerts a pressure of 4 kg/cm$^2$ on the compacted coffee bed. As soon as the concentration of coffee in the liquid phase between the coffee particles at a distance of 50 mm from cover 23 becomes less than 0.5wt percent, solenoid valve 36 is closed. Thereupon cover 23 is lifted from column 1 by the cylinder 24 and piston 3 presses an amount of compacted coffee out of the wash column 1 equal to the amount of coffee particles fed to the wash column during the suction stroke of piston 3. Said amount of extracted coffee particles is cut off from the compacted ice bed by cutting knife 26 and removed by slide 29. When cover 23 is lifted from the wash column, said cover will come into abutment with cylinder 24 and fresh washing liquid is drawn from vessel 35, and flows through duct 43 and non-return valve 34 into chamber 41. When cover 23 is pushed downward by means of the double-acting cylinder 24 the washing liquid is compressed, and non-return valve 34 is closed, as soon as cover 23 contacts the upper end of the wash column 1. Under said conditions the concentration of coffee solubles in the piece of the bed leaving the wash column is less than 0.5 percent by weight.

What is claimed is:

1. An apparatus for separation and purification of solids from a suspension and for leaching solid particles comprising an impervious column with a piston closing one end of the column for the compacting of the solid particles to a bed and advancing the compacted bed of solid particles during its compression stroke, said piston having passages for the supply of a liquid suspension of solid particles and the removal of the liquid phase of said suspension, treating means at the opposite end of the column for treating successive portions of said bed to facilitate removal of the treated portion from the column, discharge means at said opposite end of the column for the progressive removal of said successive portions of said bed, and means at said opposite end of said column for supplying washing fluid to said bed.

2. An apparatus according to claim 1, wherein the fluid passages in said piston include valve means adapted to pass said suspension of solid particles to said column during the suction stroke of said piston and to remove the suspending liquid phase during the compression stroke of said piston.

3. An apparatus according to claim 1 wherein the piston is provided with a screen surface facing the bed of solid particles in the column, which is selectively permeable for the liquid, and is provided with an opening for the feeding of the suspension into said column.

4. An apparatus according to claim 1 wherein said treating means includes heating means disposed at said other end of said column for melting said bed, said heating means comprising tubes internally heated with a fluid, said tubes having a heatinsulating layer on their outer surfaces at the side of the tubes opposite the piston.

5. An apparatus according to claim 4 wherein the tubes have a triangular cross-section with one point of the triangle directed toward the piston.

6. An apparatus according to claim 1 wherein said treating means includes heating means disposed at said other end of said column for melting said bed, said heating means comprising electrically heated wires.

7. An apparatus according to claim 1 wherein the means for supplying a washing liquid to said bed includes a discharge line having a valve for controlling the rate of discharge from the bed.

8. An apparatus according to claim 1 wherein said treating means includes mechanical means for the progressive removal of the solid particles from the bed.

9. An apparatus according to claim 8 wherein the means for the mechanical removal of the solid particles comprises a rotating perforated disc provided with scraping means.

10. An apparatus according to claim 8 including a cover with means to close and open the end of the column opposite to the piston and provided with a filter through which a wash fluid can be pressed into the column in the closed position of the column, and a cutting device to remove the solid particles in the open position of the column.

11. An apparatus according to claim 10 including a slide slidable relative to the cutting device and a pin fixed to the cutting device and provided with a slot in the slide, the arrangement being such that only when the cutting edge has completely cut off a piece of the bed of compressed solids the slide will move along with it when the cutting device continues its movement in the same direction and that when the cutting device is retracted the slide will first be stationary to strip off a piece of the bed of compressed solids from the cutting device so that it will be removed.

12. An apparatus according to claim 10 including a piston in the cover adapted to serve as a feeding pump for the wash fluid to the column.

13. An apparatus according to claim 12 including a feed line between the pump and the column having a valve to control the location of the wash front.

14. An apparatus according to claim 1 wherein said treating means includes heating means disposed at said other end of said column for melting said bed, said heating means consisting of at least two melting grates, each grate being positioned parallel to the surface of the piston.

15. An apparatus according to claim 1 wherein said treating means includes a heating means disposed at said other end of said column for melting said bed, said heating means comprising spaced heating elements, the spacing between said elements being at least 1.0 mm.

16. Apparatus for the separation and purification of solids from a suspension and for leaching solid particles comprising an impervious column including:
 a. piston means closing one end of said column and mounted for reciprocating movement within said column to compact the solid particles to a bed and advance said compacted bed of solid particles to the opposite end of said column during the compression stroke of said reciprocating movement, said piston means including:
  i. a surface facing the bed of solid particles;
  ii. filtering means on said surface which is selectively permeable for the liquid phase of said suspension;
  iii. feeding means in communication with said surface for feeding said suspension into said column, said feeding means including:
   a. at least one opening in said surface and
   b. at least one conduit in flow communication with said opening;
  iv. first discharge means for the removal of said liquid phase of said suspension from said column including at least one conduit in flow communication with said filtering means;
  v. valve means in said at least one conduit of said feeding means to pass said suspension to said column only during said suction stroke of said reciprocating movement;
  vi. valve means in said at least one conduit of said discharge means to remove said liquid phase only during said compression stroke of said reciprocating movement; and
 b. treating means at the opposite end of said column for treating successive portions of said bed to facilitate removal of the treated portion from said column and discharge means at said opposite end of said column for the progressive removal of said successive portions of said bed.

17. Apparatus according to claim 16 in which said treating means includes a rotating disc having scraping means and openings for passing the scraped-off portions through said disc, and means end of said column for supplying washing liquid to said bed.

18. Apparatus according to claim 17 in which said discharge means includes a discharge line having a valve for controlling the rate of discharge from said bed.

* * * * *

UNITED STATES PATENT OFFICE
CERTIFICATE OF CORRECTION

Patent No. 3,777,892     Dated December 11, 1973

Inventor(s) Thijssen et al

It is certified that error appears in the above-identified patent and that said Letters Patent are hereby corrected as shown below:

Claim 17, line 4, after "means", insert -- at said opposite --

In the heading, under "United States Patent", delete:

"Thijssen et al.", insert -- Thijssen --

Page 1, Column 1, delete: "Inventor: Henricus A. C. Thijssen et al., 2", insert -- Inventor: Henricus A. C. Thijssen, 2 --

Signed and sealed this 16th day of April 1974.

(SEAL)
Attest:

EDWARD M. FLETCHER, JR.
Attesting Officer

C. MARSHALL DANN
Commissioner of Patents